United States Patent [19]
Marrotte

[11] Patent Number: 5,682,017
[45] Date of Patent: Oct. 28, 1997

[54] METAL OUTLET BOX WITH SNAP TOGETHER BASE AND COVER

[75] Inventor: John R. Marrotte, Windham, Conn.

[73] Assignee: The Wiremold Company, West Hartford, Conn.

[21] Appl. No.: 436,613

[22] Filed: May 8, 1995

[51] Int. Cl.[6] .................................. H02G 3/12
[52] U.S. Cl. ............................................ 174/53
[58] Field of Search .................... 174/53, 48, 66, 174/50; 220/3.6, 3.8

[56] References Cited

U.S. PATENT DOCUMENTS

| 1,672,683 | 6/1928 | Knoderer | 174/53 |
| 3,444,345 | 5/1969 | Mackiewicz | 200/168 |
| 3,676,571 | 7/1972 | Rubinstein | 174/65 |
| 4,295,575 | 10/1981 | Flachbarth | 220/3.92 |
| 4,445,622 | 5/1984 | Sideri | 220/306 |
| 4,529,834 | 7/1985 | Nattel | 174/53 |
| 5,180,074 | 1/1993 | Bowman et al. | 220/3.8 |
| 5,420,376 | 5/1995 | Rajecki et al. | 174/48 |
| 5,430,251 | 7/1995 | Freudner et al. | 174/53 |

Primary Examiner—Kristine L. Kincaid
Assistant Examiner—Joseph Waks
Attorney, Agent, or Firm—McCormick, Paulding & Huber

[57] ABSTRACT

A mild alloy steel is used to stamp the metal base into a configuration that provides channel shaped ribs just inboard of each end of the base. Each rib defines a downturned tab at the ends to provide a downwardly facing abutment surface adjacent each corner of the rectangular base. The cover, of the same material, has end walls that define flanges that are arranged flush with the side walls of the rectangular cover. These side walls have tabs bent around these flanges to define upwardly facing abutment surfaces. These abutment surfaces lock in place at assembly of the base and cover obviating the need for conventional screw fasteners.

20 Claims, 3 Drawing Sheets

METAL OUTLET BOX WITH SNAP TOGETHER BASE AND COVER

BACKGROUND OF THE INVENTION

1. Field of the Invention

The present invention relates to electrical outlet boxes fabricated of mild alloy steel, and deals more specifically with a metal box having a base of generally flat configuration adapted to be attached to a wall structure or the like, and a cover that is secured to the base without requiring conventional mounting screws of the like. The cover can be selected from a group of covers of different depth depending upon the type of electrical device to be accommodated therein.

2. Description of the Prior Art

Metal outlet boxes of the type utilizing a generally flat base and a cover adapted to be received by the base generally require the use of mounting screws for securing the cover to the base. Plastic outlet boxes have been provided with enough resiliency to allow snapping the components together without requiring the use of conventional fasteners. However, metal outlet boxes are generally fabricated from a mild alloy steel, and such material does not exhibit sufficient resiliency to permit the techniques used in plastic outlet boxes to be applied to the fabrication of two component metal outlet boxes.

Electric switch housings of plastic have been assembled with a metal base as shown for example in U.S. Pat. No. 2,665,353. However, where two mild alloy steel components are to be snapped together difficulties arise due to the lack of resiliency in the mild alloy steel generally used for producing these products. U.S. Pat. No. 4,697,044 shows one attempt to avoid this problem characteristic of mild alloy steel where the snap-on cover of a metal casing is fabricated with a predetermined set in one direction so that when snapped in place the steel cover assumes a flat configuration in its stressed condition. In effect the steel cover has two conditions between which it moves in a sort of oil-canning mode without requiring any great degree of force to cause this oil-can type movement from one condition to the other. Such an approach to the design of a snap together metal outlet box cover and base would not be satisfactory due to the inherent lack of stability for the components held together solely as a result of this rather unstable oil-canning configuration of mild alloy steel sheet or plate.

SUMMARY OF THE INVENTION

It is a general purpose and object of the present invention to provide a mild alloy steel metal base and cover combination which can be assembled in a snap together assembly step which obviates the need for conventional screw fasteners, and which nevertheless secures these two components together in a very stable condition such that striking the cover with a moderate blow does not cause the cover to be disengaged from the base.

These objects are accomplished with the present invention by providing a cover of mild alloy steel readily adapted to be stamped from sheet material and having side and end walls integrally connected to a top wall. The cover further includes a bottom edge defining a downwardly open recess. The end walls of the cover define conventional knockout openings adjacent to the bottom edge suitable for receiving conventional electrical conduits. The end walls have corner defining flanges oriented perpendicular to these end walls and these flanges are arranged to be flush with the end portions of the side walls so that clinched tabs defined adjacent the end portions of the side walls can be folded over each flange and thereby define an abutment surface which is spaced from the bottom edge of the cover. The base is also stamped from mild alloy steel sheet material and has a shape and size corresponding generally to that of the cover bottom edge. The base has raised ribs in the shape of channels extending across the base from one side to the other. Each channel has a top portion defining a web of the channel, and the top portion or web defines down-turned abutment surfaces at each end adapted to engage the abutment surfaces defined by the clinched tabs. Locating these ribs adjacent the end portions of the base, and restraining the exterior surfaces of the cover side by up-turned flanges on walls of the base provides an interference fit between the cover and the base wherein the abutment surfaces lock the cover to the base.

DETAILED DESCRIPTION

Turning now to the drawings in greater detail, in its preferred form the present invention contemplates a two component metal electric outlet box. Such metal outlet boxes are generally fabricated from a mild alloy steel material which exhibits only a very limited degree of resiliency. Electric outlet boxes made of such material generally require screw fasteners to assemble the cover to the base. The base is generally attached to an existing wall structure or the like and the cover secured to it by screw fasteners. In the prior art base, a generally flat shape has been used, with dimpled areas suitable for receiving mounting screws (see for example the dimpled area indicated generally at 10 in the base of FIG. 1). By the same token, a prior art cover is generally provided with openings that are countersunk for purposes of receiving the ends of screw fasteners which extend from the top of the cover into the base being such that the ends are threadably received in threaded openings in the dimpled areas such as that shown at 10 in FIG. 1.

Figure 1:
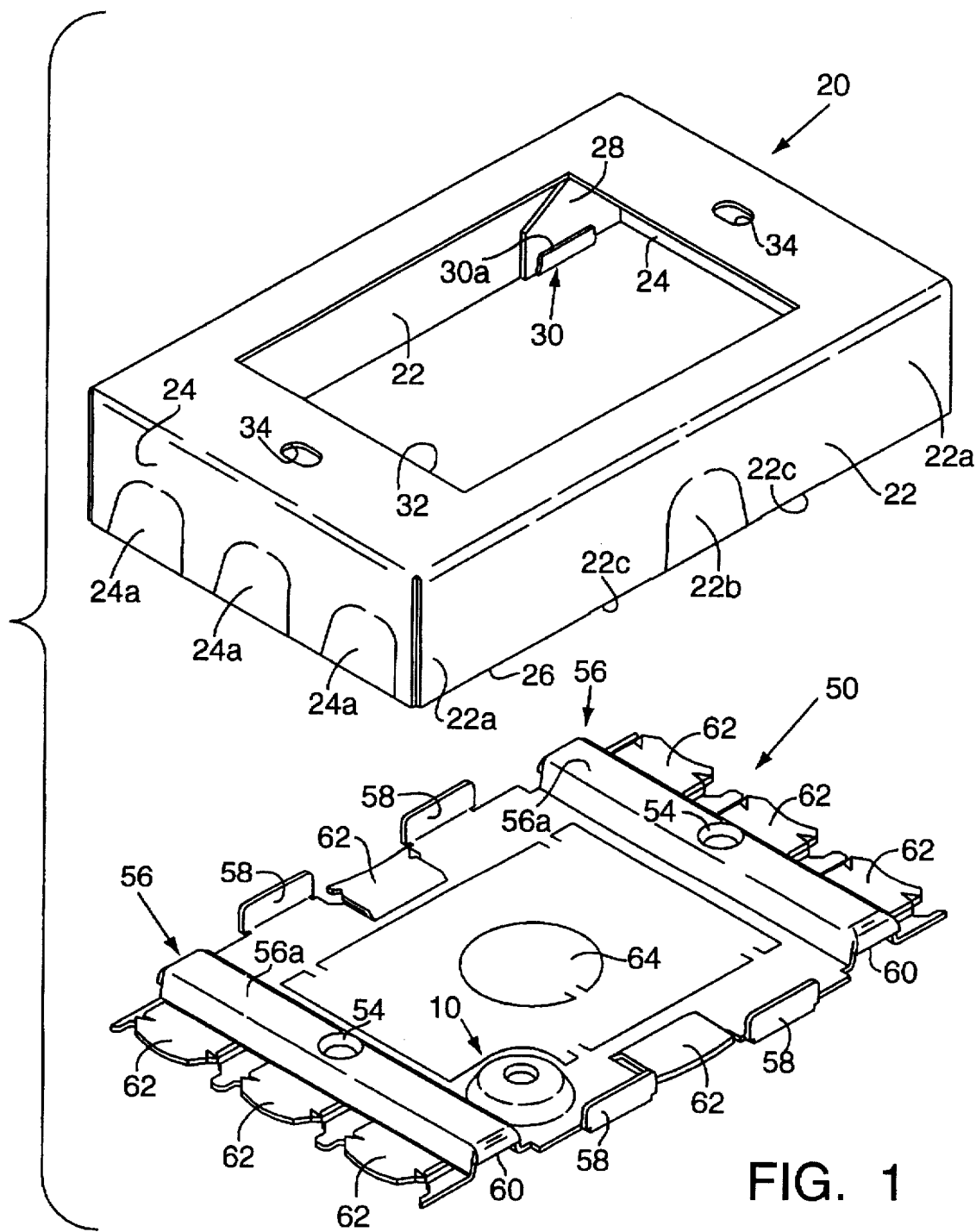
FIG. 1 is a perspective view showing in exploded relationship the soft or mild alloy steel cover and base of the present invention.

The present invention seeks to obviate the need for use of such threaded fasteners for securing a stamped metal cover to a stamped metal base. As shown in FIG. 1, the cover 20 is adapted to be received on the base 50 and to be held in secure assembled relationship with respect thereto without the need for screw fasteners and without the threaded openings therefor in the base.

The base 50 is of generally rectangular configuration corresponding in size and shape to the open bottom defined by the stamped metal cover 20.

The cover 20 includes integrally formed side and end walls 22 and 24 respectively, which cooperate to define corners for the cover, and which side and end walls also define a downwardly open bottom for the cover. The bottom edge 26 of the cover 20 is adapted to fit onto the base 50 and to be held in secure assembled relation with the base as described below.

Referring more specifically to the configuration of the cover 20, FIG. 1 shows that each corner includes a corner defining flange 28 that is oriented perpendicular to and is integrally connected to the end wall 24. Four such corner flanges are provided, each of which is integrally connected to one or the other of the two end walls 24,24. These flanges are oriented so as to be parallel to and in flush engagement with end portions 22a, 22a of the side walls 22,22 respectively. Further, each end portion of the end walls defines a tab that is adapted to be clinched in the position that is indicated generally at 30 in FIG. 1. These tabs 30,30 not only serve to add additional strength to the side wall end portions 22a, but the upper edge of each tab serves as an abutment surface 30a for engaging an abutment surface defined in the base 50 to be described.

Still with reference to the cover 20, a top wall defines a generally rectangular opening 32 suitable for receiving an electrical device (not shown) such as a plug or electrical switch or other electrical device. Mounting holes 34 are provided in the top wall of the cover 20 for mounting such devices in this opening 32. The end walls of the cover include three knockouts 24a for providing suitable openings to receive conventional electrical conduits (not shown). The side walls 22 of the cover 20 also define knockouts 22b for the same purpose, namely to afford receptacles for conventional conduits (not shown). The cover shown has a vertical dimension or height that will accommodate most of the electrical devices normally encountered. However, covers of shallower or greater vertical dimension can also be assembled with the base to be described.

As mentioned previously, the base 50 is adapted to be secured to an existing wall structure or the like, and countersunk openings 54 are provided in the base for this purpose. These openings 54 are provided in addition to the more conventional opening configuration shown at 10 and described previously. The conventional opening configuration shown at 10 is intended for use as a grounding screw receptacle for use by the electrician who installs the box and who will accomplish the assembly of the cover with the base in a manner to be described.

The base 50 is fabricated from a mild alloy steel sheet material in much the same manner as used in connection with the fabrication of the cover 20. The base of the present invention preferably includes raised channel shaped ribs, as indicated generally at 56, the ribs extending across the base from one side to the other of the base. Each channel shaped rib 56 has a flat top surface or web 56a of the channel. Each channel is downwardly open, and the top surface provides a convenient area for defining the countersunk openings 54 that receives the screws (not shown) that serve to secure the base 50 to a wall structure or the like (not shown). At each side of the base 50 a pair of up-turned flanges 58,58 are provided to engage the exterior surfaces of the side walls 22 of the cover 20.

The channel shaped ribs 56 are provided parallel to the end walls of the cover when the cover and base are assembled with one another, and it is an important feature of the present invention that abutment surfaces 60 are defined at the ends of these channel shaped ribs, 56 and more particularly by the end portions of the top wall 56a of these channel shaped ribs 56 as shown in FIG. 1. The top wall 56a of the channel shaped rib is wide enough so that when the end portions are bent downwardly as shown, they overly the side walls 56b of the channel shaped ribs. As so supported the end portions have downwardly facing abutment surfaces 60 that are adapted to engage the above described abutment surfaces 30a of the clinched tabs 30,30 of the cover 20.

As so constructed and arranged, the cover 20 can be forcibly applied to the base as a result of which the upwardly facing abutment surface 30a of the clinched tab 30 will engage the downwardly facing surface 60 of the down-turned channel top wall 56a. This engagement occurs adjacent all four corners and more particularly in spaced relationship to the four corners of the cover.

Still with reference to the base 50, a plurality of barbed tongues 62 are defined at the ends of the base and these barbed tongues 62,62 correspond in location with the three knockout openings 24a of the cover. As so constructed and arranged a conventionally shaped conduit can conveniently be secured to the base to assist in holding the conduit in place while the installer or electrician provides wires to the electrical outlet box location and prior to assembly of the cover. Depending on how many conduits are to be received at the electrical outlet box, one or more knockouts 24a or 22b will be removed to provide the desired arrangement of outlet box and conduits in a particular installation. Tongues 62,62 are also provided in the side walls of the base 50 and are aligned with the single knockout 22b provided in the side wall of the cover as described previously. A center knockout 64 in the base 50 may be provided to accommodate wiring to and from the electrical outlet box from the wall structure to which the base is attached.

Figure 2:
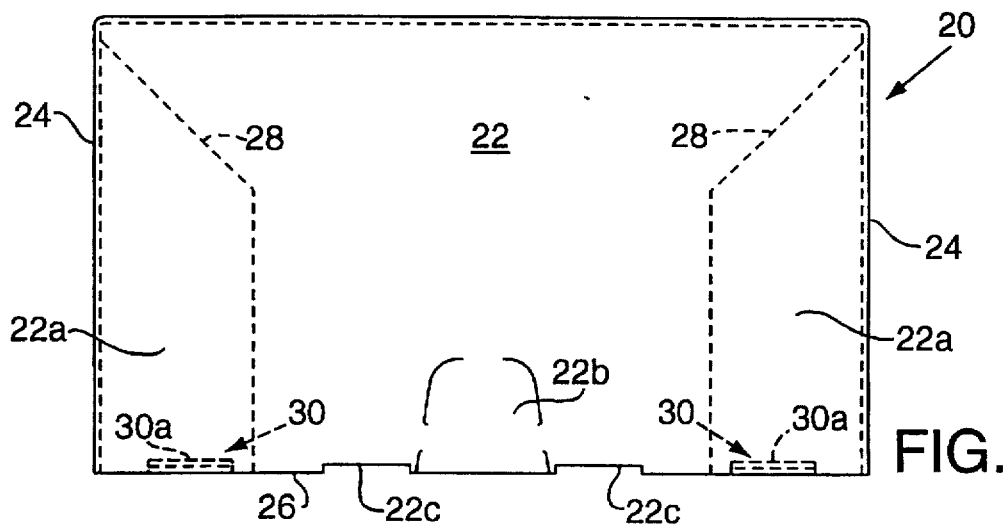
FIG. 2 is an elevational view showing the cover of FIG. 1.
Figure 3:
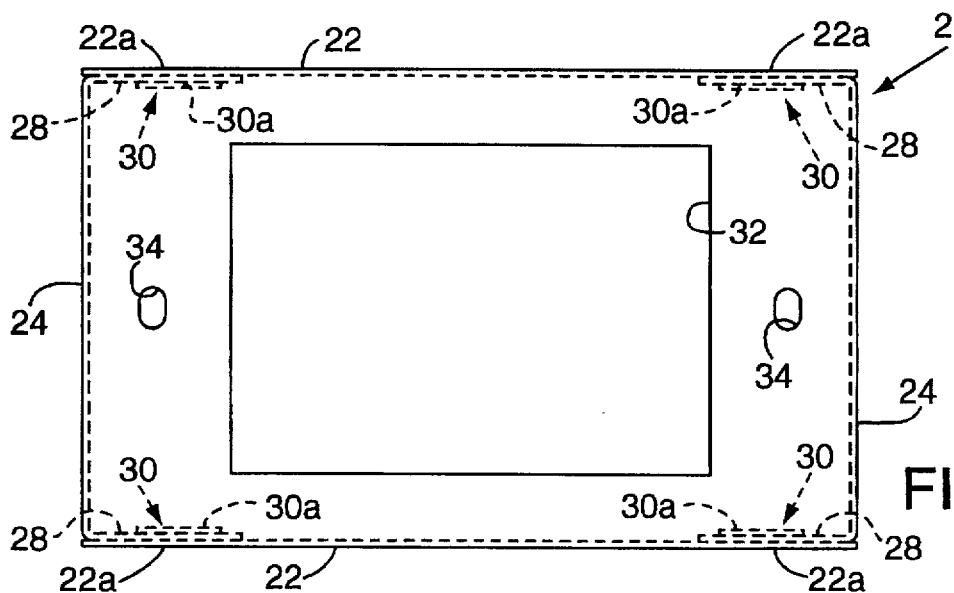
FIG. 3 is a top plan view thereof.
Figure 4:
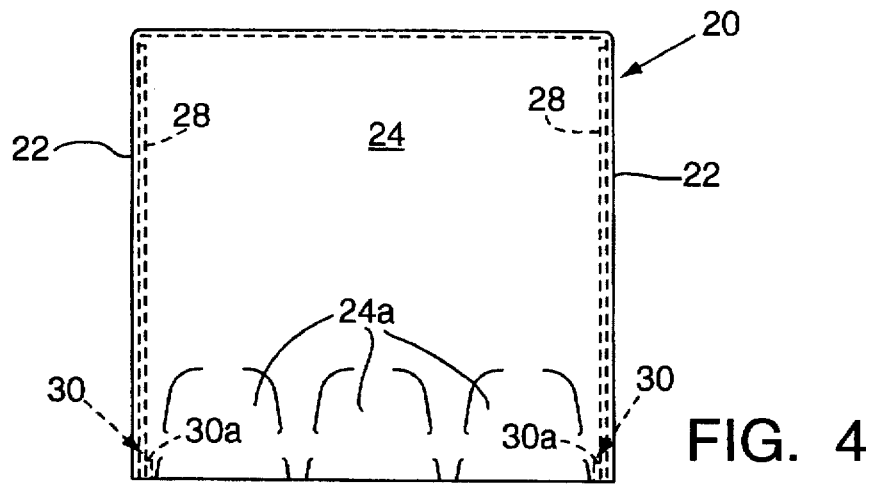
FIG. 4 is an end view thereof.

FIGS. 2, 3 and 4 illustrate the cover in conventional three view arrangement, the abutment surfaces defined by the clinched tabs 30 being illustrated at 30a in these views. FIG. 3 shows the generally U-shaped configuration for each of the end walls 24,24 and also illustrates the flanges 28 defined integrally with these end walls and abutting the inside of each side wall 22. FIGS. 2 and 3 show the conduit knockouts 24a and 22b.

Figure 5:
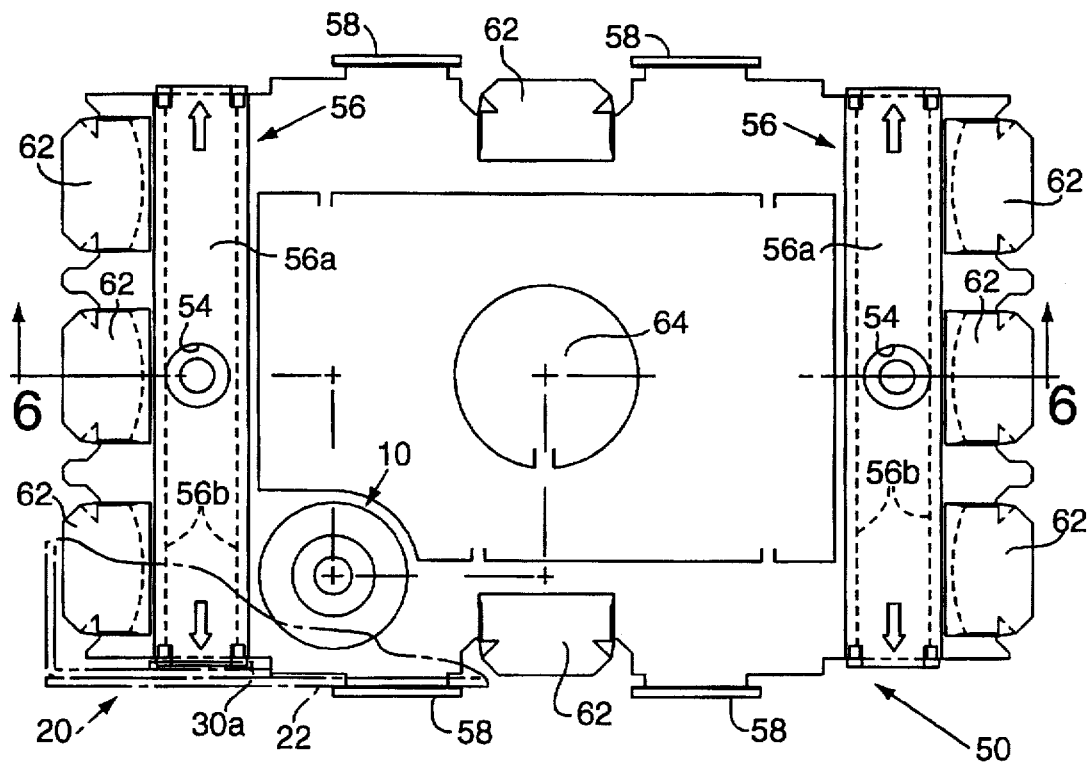
FIG. 5 is a top plan view of the base illustrated in FIG. 1, and also shows one corner of the cover of FIGS. 2, 3 and 4.
Figure 6:
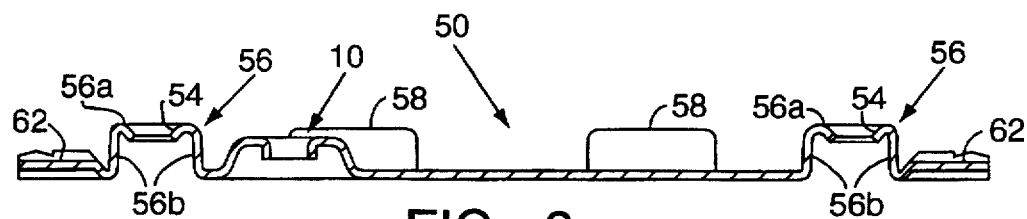
FIG. 6 is a sectional view taken along the lines 6,6 of FIG. 5.
Figure 7:
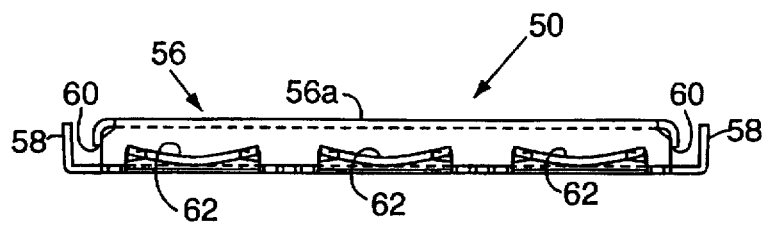
FIG. 7 is an end view thereof.

FIGS. 5, 6 and 7 illustrate in typical three view arrangement the configuration of the stamped metal base 50. FIGS. 6 and 7 illustrate the specific configuration for each of the tongues 62,62. These tongues are of conventional configuration and adapted to be received in the open ends of conventionally configured conduits (not shown) which conduits have a shape corresponding to the shape of the knockouts 24a and 22b in the cover 20. FIGS. 5 and 7 illustrate in some detail the configuration for the down-turned tabs that serve to define the downwardly facing abutment surfaces 60 which cooperate with the upwardly facing surfaces 30a of the tabs 30 of the cover 20. FIG. 6 clearly shows the channel shaped configuration for each of the ribs that provide stiffening for the base 50 in the area of these abutment surfaces. FIG. 5 illustrates the configuration for the up-turned flanges 58,58 that serve to engage the exterior surface of each cover side wall 22. Note that FIG. 2 shows cutouts as indicated generally at 22c for receiving the portion of the base 50 that extends horizontally outwardly to provide the up-turned flanges 58,58 described previously. At the lower left hand portion of FIG. 5 one corner of the box 20 is shown to illustrate the relationship between the corner of the box 20 and the up-turned flange 58 with respect to the down-turned flange on the end of the rib. It should be noted that this down-turned tab and its abutment surface 60 is located generally between the corner of the cover 20 and the immediately adjacent up-turned flange 58 of the base. This geometry provides for limited resiliency of the cover side wall 22 and allows an interference fit to be achieved between these three points with the result that the abutment surfaces 30a and 60 engage one another with sufficient force to remain assembled securely together even when subjected to forces that would otherwise result in knocking the cover away from its base but for the unique geometries for the affected areas of these stamped mild alloy (soft) steel components.

Another feature of the present invention attributable to the elimination of the need for screw fasteners is due to the fact that a single base geometry can accept covers of different height. This requirement, also true of the prior art covers, requires screw fasteners of different length when used to assemble a conventional cover to a conventional base. With the present invention no fasteners are required. Hence, covers of various height can be assembled with a common base configuration without any screw fasteners of different length. This advantage leads to economies of both supply and inventory requirements, and to economics realized during installation.

I claim:

1. An electrical outlet box comprising a cover stamped from mild alloy steel sheet material so as to have side and end walls integrally connected to a top wall, said side and end walls defining a bottom edge, said end walls defining knockouts adjacent said bottom edge for receiving electrical conduits, and said end walls having corner defining flanges oriented perpendicular to said end walls and arranged flush with end portions of the side walls, and a clinched tab folded over each flange to define an abutment surface spaced from said cover bottom edge, a base also stamped from mild alloy steel sheet material and having a shape and size corresponding generally to that of said cover bottom edge, said base having raised ribs extending across said base from one side to the opposite side of said base, said ribs having down-turned abutment surfaces defined at end portions thereof, and said rib defined abutment surfaces cooperating with said abutment surfaces of said clinched tabs to hold said cover in assembled relationship to said base, and said raised ribs provided in the shape of downwardly open channels, each channel shaped rib having a flat raised top portion and channel sides, and said down turned abutment surfaces being formed by bending the ends of said top portions downwardly to define said abutment surfaces which overlie the ends of said channel sides to increase the relative rigidity of said down turned abutment surfaces of said ribs for cooperation with said abutment surfaces defined by said clinched tabs of said cover.

2. The electrical outlet box of claim 1 wherein said base has up-turned flanges for engaging said cover side walls.

3. The electrical outlet box according to claim 2 wherein said ribs are provided parallel said end walls when said cover is assembled with said base, said abutment surfaces of said ribs and said clinched tabs being provided between said cover end walls and said base flanges and engaging the exterior of said covered side walls.

4. The electrical outlet box according to claim 3 wherein said base has two up-turned flanges on said one and an said opposite side of said base.

5. The electrical outlet box according to claim 1 wherein said base defines conduit engageable tongues at said one and an said opposite thereof, said tongues provided in alignment with said knockouts in said cover end walls.

6. The electrical outlet box according to claim 1 wherein said base has up-turned flanges on each side for engaging said cover side walls in spaced relationship to said rib abutment surfaces of said base.

7. The electrical outlet box according to claim 6 wherein said ribs are provided parallel said end walls when said cover is assembled with said base, said abutment surfaces of said ribs and said clinched tabs being provided between said cover end walls and said base flanges so that said flanges engage the exterior of said cover side walls in closely spaced relationship to said rib abutment surfaces.

8. The electrical outlet box according to claim 7 wherein said base has two up-turned flanges on each side of side of said base.

9. The electrical outlet box according to claim 2 wherein said base defines at least one conduit engageable tongue between said two flanges on each side of said base and each said cover a side wall defining a knockout aligned with said at least one conduit engageable tongue and said base.

10. The electrical outlet box according to claim 9 wherein said base has conduit engageable tongues at one and an opposite end thereof, said tongues at the ends of said base provided in alignment with said knockouts in said cover end walls.

11. The electrical outlet box according to claim 10 wherein mounting holes are provided in said base.

12. An electrical outlet box comprising a cover stamped from mild alloy steel sheet material so as to have side and end walls integrally connected to a top wall, said side and end walls defining a bottom edge, said end walls defining knockouts adjacent said bottom edge for receiving electrical conduits, and said end walls having corner defining flanges oriented perpendicular to said end walls and arranged flush with end portions of the side walls, and a clinched tab folded over each flange to define an abutment surface spaced from said cover bottom edge, a base also stamped from mild alloy steel sheet material and having a shape and size corresponding generally to that of said cover bottom edge, said base having raised ribs extending across said base from one side to the opposite side of said base, said ribs having down-turned abutment surfaces defined at end portions thereof, and said rib defined abutment surfaces cooperating with said abutment surfaces of said clinched tabs to hold said cover in assembled relationship to said base, and said ribs provided are parallel said end walls when said cover is assembled with said base, said abutment surfaces of said ribs and said clinched tabs provided between the end walls of said cover.

13. The electrical outlet box according to claim 12 wherein said base has two up-turned flanges on said one and an said opposite side of said base.

14. The electrical outlet box according to claim 12 wherein said base defines conduit engageable tongues at each side of said base, said tongues provided in alignment with said knockouts in said cover end walls.

15. The electrical outlet box according to claim 12 wherein said ribs are provided in the shape of downwardly opened channels, having a flat raised top portion, and said down turned abutment surfaces being formed by bending the ends of said top portions downwardly to define rib abutment surfaces which overlie the ends of channel sides to increase the relative rigidly of the said downtown abutment surfaces of said ribs for cooperation with said abutment surfaces defined by said clinched tabs of said cover.

16. The electrical outlet box according to claim 12 wherein said base has up-turned flanges on each side for engaging said cover side walls in spaced relationships to said rib abutment surfaces of said base.

17. The electrical outlet box according to claim 15 wherein said base has two up-turned flanges on one and an opposite side of said base.

18. The electrical outlet box according to claim 17 wherein said base defines at least one conduit engageable tongue between said two flanges on each side of said base and said cover side wall defining a knockout aligned with said at least one conduit engageable tongue and said base.

19. The electrical outlet box according to claim 18 wherein said base has conduit engageable tongues at one and an opposite end thereof, said tongues at the ends of said base provided in alignment with said knockouts in said cover end walls.

20. The electrical outlet box according to claim 19 wherein mounting holes are provided in said base.

* * * * *